United States Patent [19]

Richter

[11] Patent Number: 4,706,110

[45] Date of Patent: Nov. 10, 1987

[54] APPARATUS FOR DECODING A PAL STANDARD COLOR TELEVISION SIGNAL

[75] Inventor: Hans-Peter Richter, Griesheim, Fed. Rep. of Germany

[73] Assignee: Robert Bosch GmbH, Stuttgart, Fed. Rep. of Germany

[21] Appl. No.: 927,735

[22] Filed: Nov. 5, 1986

[30] Foreign Application Priority Data

Nov. 7, 1985 [DE] Fed. Rep. of Germany ....... 3539416

[51] Int. Cl.$^4$ ..................... H04N 9/45; H04N 9/465
[52] U.S. Cl. ........................................ 358/19; 358/18; 358/24
[58] Field of Search ............................. 358/18, 19, 24

[56] References Cited

U.S. PATENT DOCUMENTS 4,349,833 9/1982 Clarke .................................. 358/23
4,527,145 7/1985 Haussmann et al. .................. 358/19

Primary Examiner—John W. Shepperd
Attorney, Agent, or Firm—Frishauf, Holtz, Goodman & Woodward

[57] ABSTRACT

The synchronously demodulated chrominance signals ($C_{1d}$, $C_{2d}$) each alternately represent, line by line, the sum and difference of the color difference signals U and V. They are supplied to a multiplexer (21) switched by a meander wave having a 2H oscillation period and supplied therefrom to an accumulator for evaluation of the synchronizing color carrier bursts. During the burst, a succession of sampling frequency pulses sample the burst portion of one chrominance signal ($C_{2d}$) with the results being added in an accumulator and then loaded in a first register (25) to provide a control signal for the color carrier oscillator and from the burst portion of the other chrominance signal ($C_{1d}$) a potential is similarly produced by the accumulator, loaded in a second register (26) and evaluated in a PROM to determine whether the switching of the reversal circuit or one of the color difference signals (V) is timed for the correct horizontal line or for the wrong one. In the latter case, the meander wave is held for a half period of its oscillation which in effect inverts it, thereby correcting its timing.

8 Claims, 3 Drawing Figures

APPARATUS FOR DECODING A PAL STANDARD COLOR TELEVISION SIGNAL

This invention concerns the decoding of a digital color television signal which conforms to the PAL television standard and more particularly to a system for such decoding including a comb filter for separating luminance and chrominance information, the chrominance information being alternately presented, line by line, as the sum and the difference of color difference signals, wherein the latter are converted into two video frequency color signals by synchronous demodulators correspondingly controlled by a color carrier generator synchronized with the synchronizing burst of the color television signal, after which the desired color difference signals U, V can be derived by obtaining the difference and sum. The V signal thus generated is inverted from line to line (alternating polarity) by means of a switching phase reset circuit controlled by the burst. For this purpose, control signals for synchronizing and control are derived from the burst of the video frequency color signals.

A known kind of decoding of PAL color television signals of the above-mentioned type is shown in FIGS. 1–8 of allowed U.S. patent application 598,088, filed Apr. 9, 1984, now U.S. Pat. No. 4,641,180 the disclosure of which is hereby included by reference. The demodulation circuit there described in accordance with FIG. 8 of that application shows the use of a burst evaluation circuit by which outputs of the synchronous demodulators are utilized for controlling the voltage-controlled oscillator that generates the color carrier frequency. The latter is is provided to the two synchronous detectors by waves differing in phase by 90°. It is disclosed that a switching signal for the phase reversal circuit can be obtained conventionally from this burst evaluation circuit.

SUMMARY OF THE INVENTION

It is an object of the present invention to provide an improved burst evaluation circuit which is particularly well-fitted for controlling the color carrier generator and the phase or polarity reversing circuit in the decoding of the chrominance information of a digital PAL color television signal.

Briefly, the video frequency color difference signals are supplied to a multiplexer which is switched by a meander signal having a period (2H) of twice the line scanning period, the output signal of the multiplexer is supplied through an accumulator to each of two registers at the respective outputs of which are provided a control voltage for the color carrier generator and a switching signal for the phase reversal circuit.

The invention has the advantage that a particularly effective burst evaluation circuit is provided without any great additional expense.

It is particularly advantageous for the output of the multiplexer to be connected of one of two inputs of the accumulator while the other input thereof is connected to the accumulator output that also goes to the inputs of the registers, the accumulator being supplied with many sampling pulses of the signal sampling frequency during the duration of each burst and also being supplied with an erasing pulse just before the beginning of a burst for erasing the value stored in the accumulator. Further details of the invention are pointed out in the comprehensive description that follows.

BRIEF DESCRIPTION OF THE DRAWINGS

The invention is further described by way of illustrative example with reference to the annexed drawings in which.

DESCRIPTION OF THE ILLUSTRATED EMBODIMENTS

Figure 1:
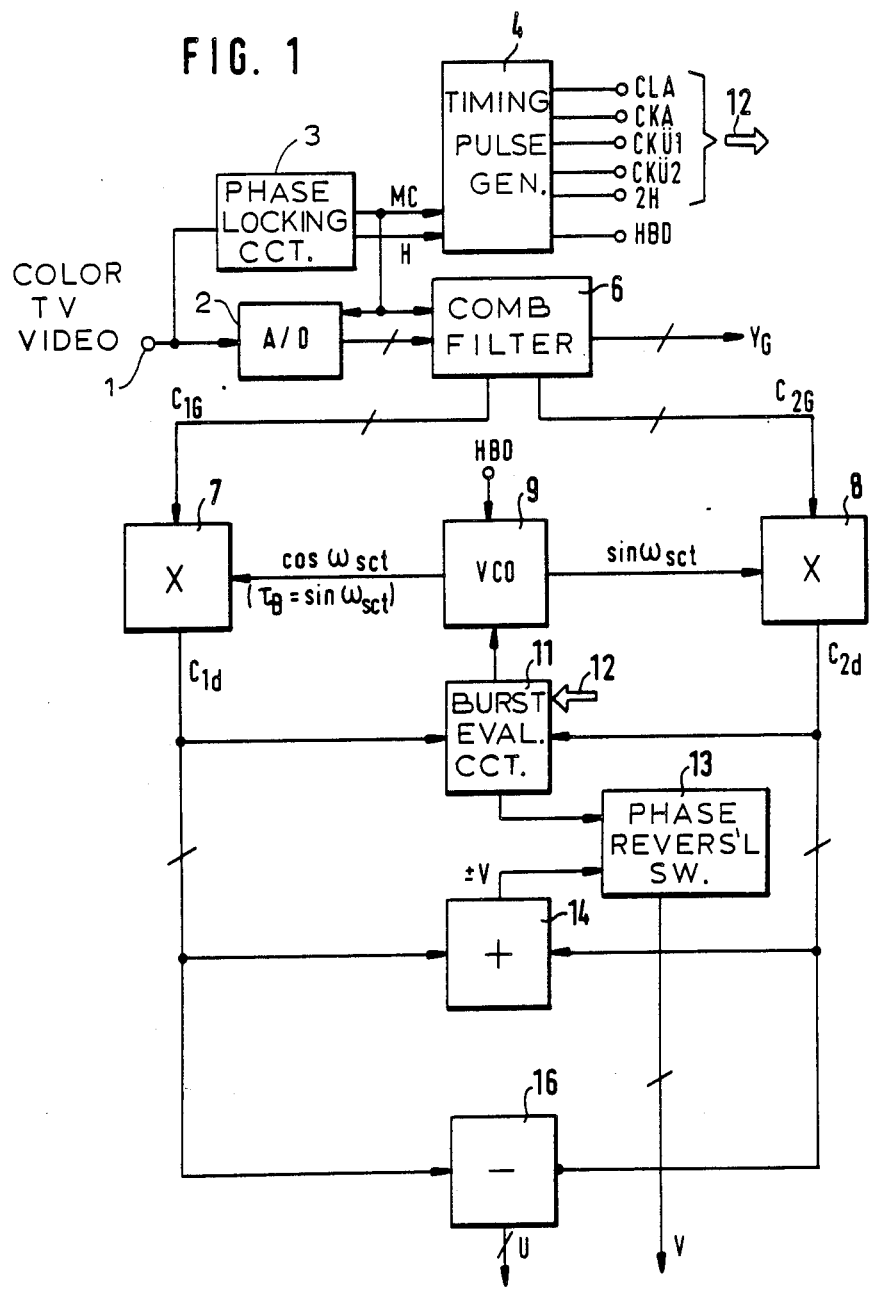
FIG. 1 is a circuit block diagram of an illustrative embodiment of the invention.

An analog composite color television signal in accordance with the PAL transmission standard, supplied on the terminal 1 of the circuit of FIG. 1 is converted by the analog-digital converter 2 into a digital signal, for example, an 8 bit per sample signal. At the same time, the analog signal is supplied through a synchronizing or phase locking circuit 3 by which the sampling signals MC of the sampling frequency $f_A$, preferably 13.5 MHz, are locked firmly in phase to the synchronizing pulses of the composite color television signals for digital processing of the latter. The circuit 3 also supplies the horizontal synchronizing signals H derived from the composite color television signal.

Figure 3:
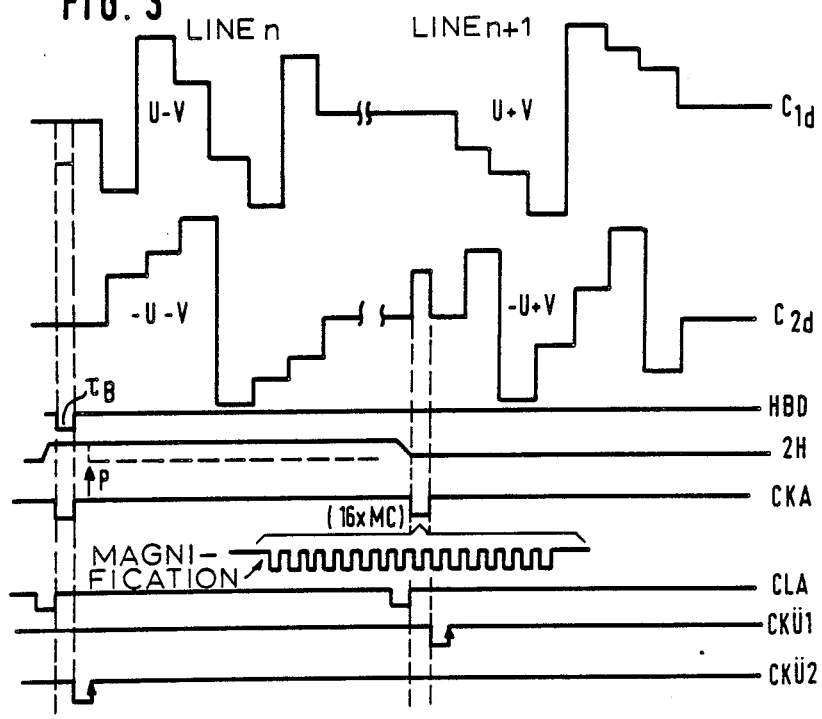
FIG. 3 is a timing diagram showing various signals occurring in the circuits of FIGS. 1 and 2, one above the other on a common time scale.

The two output signals of the synchronizing or phase locking circuit 3, namely the signals MC and H are supplied to the timing pulse generator 4 in which a series of output signals are derived from the supplied signals, identified in FIG. 1 and illustrated in the timing diagram of FIG. 3.

The output of the A/D converter 2 is connected to the input of a comb filter circuit 6 by which there are produced a comb filtered luminance signal $Y_G$ and two chrominance signals $C_{1G}$ and $C_{2G}$. These chrominance signals represent, line by line, the sum and the difference of the color difference signals.

Figure 2:
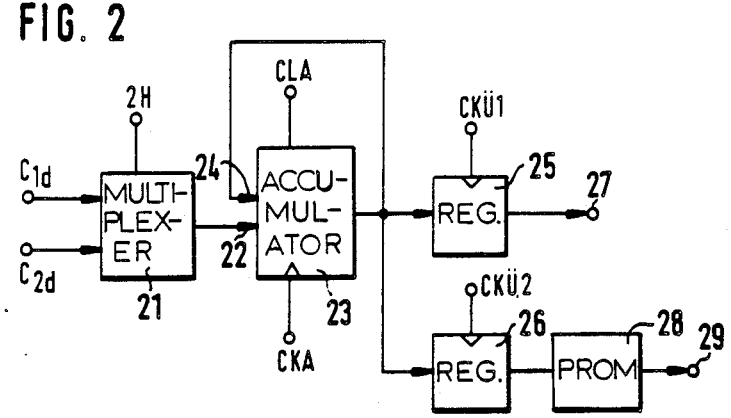
FIG. 2 is a circuit block diagram in greater detail for the burst evaluation circuit shown in FIG. 1.

For demodulation, these color carrier frequency signals $C_{1G}$ and $C_{2G}$ are respectively supplied to the synchronous demodulators 7 and 8 in which they are respectively multiplied by color carrier signals differing in phase from each other by 90°, so that at their outputs it is possible to obtain, respectively, the video frequency chrominance signals $C_{1d}$ and $C_{2d}$, the wave form of which is illustrated in FIG. 3 for a color bar pattern. The color carrier signal is generated by a controllable oscillator 9 which is controlled by a burst evaluation circuit 11 which separates the demodulated burst signal. The signal HBD is additionally supplied from the timing pulse generator 4 to the oscillator 9 in order to shift or rotate the phase of the color carrier by 90° during the burst duration $\tau_b$ of the demodulated chrominance signal $C_{1d}$, where $\tau_b = \sin \omega_{sct}$. In consequence in the phase locked condition the burst is reduced to zero. The burst evaluation circuit 11, which is further described in connection with FIG. 2, is supplied with five of the six output signals of the timing pulse generator 4 which are collectively represented by the hollow arrows 12 in FIG. 1. The burst evaluation signal, in addition to generating the control signal for the oscillator 9, generates a switching signal for a phase reversal circuit 13.

The color difference signal V, the polarity of which changes (reverses) from line to line, is produced by addition of the two demodulated chrominance signals $C_{1d}$ and $C_{2d}$ which is performed in the addition circuit 14. This signal is accordingly inverted in the phase reversing circuit 13 for every other line by means of the switching signal supplied for the purpose. The signal V of constant polarity thus obtained is made available at the output of the circuit 13. The color difference signal U is obtained by means of the subtraction circuit 16 from the demodulated chrominance signals $C_{1d}$ and $C_{2d}$ and is available at the output of the circuit 16.

FIG. 2 shows how the burst evaluation circuit 11 is constituted. The demodulated chrominance signals $C_{1d}$ and $C_{2d}$ are supplied to respective inputs of a multiplexer 21, to which the 2H meander signal is also supplied at a third input for presenting the signals $C_{1d}$ and $C_{2d}$ in line by line alternation at the output of the multiplexer. As already mentioned, the waveform of these input signals of the multiplexer is shown in FIG. 3. The output of the multiplexer 21 is connected to one input 22 of the accumulator 23, which has another input 24 to which the output of the accumulator is fed back. During the interval occupied by the burst the input signal of the accumulator is added a number of times, preferably sixteen times, clocked by the sampling frequency $f_A$, by means of the signals CKA from the timing pulse generator 4 (FIG. 1). The accumulator then supplies, at its output, an average burst potential. The pulse signal CLA is supplied by the timing pulse generator 4 to the accumulator 23 for resetting the accumulator content to zero shortly before the beginning of the next burst.

Two registers 25 and 26 are connected to the output of the accumulator 23 which are clocked with respective loading signals CKu1 and CKu2 which are supplied in the form of pulses illustrated as to their timing in the bottom two lines of FIG. 3. The potential produced at the accumulator output produced in each cycle from the demodulated burst component of the chrominance signal $C_{2d}$ is loaded into the register 25 at a time controlled by the signal CKu1 and is supplied by the register 25 its output terminal 27 as a control signal for the color carrier oscillator 9 of FIG. 1.

In a similar way, the potential produced in each complete cycle of the accumulator 23 from the demodulated burst component of the chrominance signal $C_{1d}$ is loaded into the register 26 and is supplied from there to a programmable memory (PROM) 28 for evaluation. The PROM 28 then delivers at its output 29 a signal designating the phase reversal switching information for operating the phase reversal circuit 13 of FIG. 1.

If the loading pulses CKu2, which are of 2H frequency and designate the timing for the phase reversal information, appear for the correct line, a zero burst potential is detected in the register 26 and is supplied, through the PROM 28, after evaluation for the generation of the 2H meander signal for the phase reversal circuit 13. If the loading pulse CKu2 occurs in the wrong line, a nonzero burst potential will be detected, as the result of which the circuit for generating the 2H meander signal will be held for one line, as the result of which the 2H signal is inverted. This effect is illustrated in broken lines beginning at the instant designated by the small vertical arrow labelled "P" in the diagram of the 2H meander signal shown in FIG. 3.

Although the invention has been described with reference to a particular illustrative example, it will be recognized that modifications and variations are possible within the inventive concept.

I claim:

1. An apparatus for decoding a digital color television signal conforming to the PAL color television signal standard comprising comb filter means for separating from the composite color television signal a luminance signal and two color difference signals and supplying them for further processing at corresponding outputs, means for generating a color carrier signal having a control input, timing pulse generating means synchronized to horizontal synchronizing pulses of said color television signal, first and second synchonous demodulators connected respectively to the outputs of said comb filter means for said color difference signals and both connected to said generating means for respectively producing demodulated color difference signals, and comb filter output processing means including a phase reversal circuit for reversing the phase of one color component signal for successive television lines, a color burst evaluation circuit for controlling said color carrier generator and said polarity reversing circuit, comprising:

a multiplexer connected to receive, at first and second inputs thereof, said demodulated color difference signals ($C_{1d}$, $C_{2d}$) connected to receive a binary meander timing signal of twice the television line period (2H) at a third input thereof for alternately presenting one-line segments of said color difference signals at an output thereof;

an accumulator having a first input connected to the output of said multiplexer, an output and a second input connected to said output and additional inputs, including a sampling rate pulse input, connected to outputs of said timing pulse generating means for evaluationg, by accumulating samples at said sampling rate the color burst portion of each television line with reference, in line by line alternation, to said respective demodulated color difference signals, first register means for storing, successively, outputs as accumulated in alternate line periods by said accumulator by sampling a first of said color difference signals and thereby provide a signal for said control input of said color carrier generator;

second register means for storing, successively, outputs as accumulated in alternate line periods by said accumulator by sampling the second of said color difference signals and providing an output for further processing, and accumulator output evaluation means having an input connected to said output of said second register means and an output connected to said phase reversal circuit for correcting the control thereof in the event the output of said second register means, as evaulated by said accumulator output evaluation means, indicates that the control signals for said phase reversal means have been in erroneous polarity.

2. Color burst evaluation circuit according to claim 1, wherein said timing pulse generating means provides an erase command pulse (CLA) shortly before the beginning of the color burst portion of a television line signal which is supplied to said accumulator for erasing its content in preparation for a new accumulation operation.

3. Color burst evaluation circuit according to claim 1, wherein means are provided for shifting the phase of the color carrier output of said color carrier signal generating means by 90° during each burst period.

4. Color burst evaluation circuit according to claim 1, wherein said timing pulse generating means provides register loading command pulses (CKu1, CKu2) following in each case briefly after the termination of a burst period for timing the loading of said first and second register means.

5. Color burst evaluation circuit according to claim 3, wherein said timing pulse generating means provides register loading command pulses (CKu1, CKu2) following in each case briefly after the termination of a burst period for timing the loading of said first and second register means.

6. Color burst evaluation circuit according to claim 5, wherein the timing of said loading pulses by said timing pulse generating means is such that said loading pulse (CKu1) forsaid first register means (25) is timed to appear briefly after the end of the burst period of said second of said color difference signals ($C_{2d}$).

7. Color burst evaluation circuit according to claim 5, wherein the timing of said loading pulses by said timing pulse generating means is such that said loading pulse (CKu1) or said second register means (26) is timed to appear briefly after the end of the burst period of said first of said color difference signals ($C_{1d}$).

8. Color burst evaluation circuit according to claim 1, wherein said evaluation means connected to the output of said second register means is constituted as a programmable read-only memory (PROM).

* * * * *